(12) United States Patent
Mori et al.

(10) Patent No.: US 6,506,512 B1
(45) Date of Patent: Jan. 14, 2003

(54) COMPRESSION REGENERATIVE MACHINE FOR FUEL CELL

(75) Inventors: Hidefumi Mori, Kariya (JP); Takashi Ban, Kariya (JP); Ryuta Kawaguchi, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 132 days.

(21) Appl. No.: 09/625,754

(22) Filed: Jul. 26, 2000

(30) Foreign Application Priority Data

Sep. 28, 1999 (JP) .......................... 11-274139

(51) Int. Cl.[7] .................... H01M 8/04; F01C 11/00
(52) U.S. Cl. .................... 429/34; 418/210; 418/215; 418/216
(58) Field of Search .................... 429/12, 34, 35, 429/36, 37, 38, 39; 418/181, 210, 215, 216

(56) References Cited

U.S. PATENT DOCUMENTS 3,956,904 A * 5/1976 Edwards ................. 418/225 X
5,100,308 A * 3/1992 Gevelhoff et al. ...... 418/210 X
5,624,247 A   4/1997 Nakamura ................ 418/55.2
6,124,052 A * 9/2000 Katoh et al. .............. 429/34 X
6,312,843 B1 * 11/2001 Kimbara et al. .......... 429/34 X

FOREIGN PATENT DOCUMENTS

| JP | 3-100398 | * 4/1991 | ............ H01M/8/04 |
| JP | A-7-14599 | 1/1995 | |
| JP | A-9-250463 | 9/1997 | |
| JP | A-9-250474 | 9/1997 | |
| JP | 2000-156237 | * 6/2000 | ............ H01M/8/04 |

* cited by examiner

Primary Examiner—Stephen Kalafut
(74) Attorney, Agent, or Firm—Woodcock Washburn LLP

(57) ABSTRACT

A compression regenerative machine for a fuel cell according to the present invention comprises a displacement type compression mechanism portion C connected to an oxygen-containing gas supply side of a fuel cell F, and a displacement type regenerative mechanism portion E connected to an exhaust discharge side of the fuel cell F. A confined compression chamber 14 defined by the compression mechanism portion C and a confined regenerative chamber 24 defined by the regenerative mechanism portion E have a capacity ratio of 1.25 to 3.

5 Claims, 7 Drawing Sheets

COMPRESSION REGENERATIVE MACHINE FOR FUEL CELL

BACKGROUND OF THE INVENTION

1. Field of the Invention

This invention relates to a compression regenerative machine for a fuel cell that is used for a fuel cell system.

2. Description of the Related Art

A compression regenerative machine for a fuel cell is connected to a fuel cell in a fuel cell system used for a car as described in, for example, Japanese Unexamined Patent Publication (Kokai) No. 7-14599. In fuel cells in general, a pair of separators is disposed on both sides of an electrolyte layer. Feed grooves for supplying a fuel and an oxygen-containing gas are formed in these separators. One of the separators supplies a hydrogen-containing fuel and the other separator supplies an oxygen-containing gas such as air. In consequence, electrons move due to the chemical reaction between hydrogen and oxygen to provide a current. A fuel feed pipe and an air feed pipe are connected to the upstream side of such a fuel cell to supply the fuel and air, respectively. The air feed pipe is open to the atmosphere through a compressor that is driven by a motor. The compressor pressurizes air from the atmosphere to a predetermined pressure and supplies the air to the fuel cell. An air exhaust pipe is connected to the downstream side of the fuel cell to exhaust an exhaust gas, after oxygen is extracted from air inside the fuel cell, to the atmosphere. A regenerator, which is connected to the air exhaust pipe, assists the motor operating the compressor by using its power that is generated as the exhaust gas is expanded in the regenerator. In the fuel cell device of this kind, each of the compressor and the regenerator employs a compressor and regenerator for a fuel cell separately. In this fuel cell system, the compressor and the regenerator are constituted so that they can be operated by the same driving source.

In the conventional fuel cell system, however, no examination has been made of the capacity ratio between a closed compression chamber defined by the compressor and a closed regenerative chamber defined by the regenerator. Therefore, high power generation performance of the fuel cell has not been maintained easily, and its production cost has increased.

The fuel cell generates current by the reaction between hydrogen in the fuel and oxygen in the oxygen-containing gas, as described above. If the difference between the pressure of the fuel and the pressure of the oxygen-containing gas becomes great depending on the capacity ratio of the compression chamber to the regeneration chamber, a large load acts on the electrolyte layer inside the fuel cell with possible breakage of the electrolyte layer. Therefore, the conventional fuel cell device involves the problem of durability.

To have the pressure of the fuel and the pressure of the oxygen-containing gas uniform within a suitable range in the fuel cell system, it may be possible, in principle, to adjust the pressure of either one of the fuel and the oxygen-containing gas so as to reduce the load acting on the electrolyte layer. However, when means for adjusting the pressure of the fuel is added, the means becomes large in scale because hydrogen is supplied generally by the chemical decomposition of the fuel such as a natural gas, methanol, or the like. Eventually, the cost of production of the fuel cell system becomes high. When the pressure of the oxygen-containing gas is adjusted, oxygen cannot be supplied into the fuel cell if its pressure drops remarkably. In either case, the fuel cell system cannot maintain a high power generation performance.

SUMMARY OF THE INVENTION

In view of the problems described above, it is an object of the present invention to provide a compression regenerative machine for a fuel cell that can exhibit high durability while maintaining a high power generation performance of the fuel cell system and can prevent an increase in the production cost.

According to one aspect of the present invention, there is provided a compression regenerative machine, for a fuel cell, that includes a compression mechanism portion of a displacement type, connected to an oxygen-containing gas supply side of a fuel cell and a regenerative mechanism portion of a displacement type, connected to an exhaust gas discharge side of the fuel cell, wherein a closed compression chamber defined by the compression mechanism portion and a closed regenerative chamber defined by the regenerative mechanism portion have a capacity ratio of 1.25 to 3.

This compression regenerative machine for a fuel cell comprises a compression mechanism portion for supplying an oxygen-containing gas to a fuel cell, connected to an oxygen-containing gas supply side of a fuel cell, and a regenerative mechanism portion for expanding an exhaust gas discharged from the fuel cell, connected to an exhaust gas discharge side of the fuel cell.

The inventors of the present invention have discovered through experiments a capacity ratio between the compression chamber and the regenerative chamber from a preferred range of the pressure of the oxygen-containing gas to be supplied to the fuel cell. According to such experiments, a capacity ratio of capacity A (cc) of the closed compression chamber defined by the compression mechanism portion and the capacity B (cc) of the closed regenerative chamber defined by the regenerative mechanism portion is $$(A/B) = 1.25 \text{ to } 3.$$

In the compression regenerative machine for a fuel cell according to the present invention, the capacity ratio between the compression chamber and the regenerative chamber falls within this range. Therefore, the difference between the pressure of the fuel and the pressure of the oxygen-containing gas becomes small, a large load does not act on the electrolyte layer inside the fuel cell, and damage of the electrolyte layer can be prevented. In this instance, the pressure of the oxygen-containing gas is not lowered markedly. Therefore, a sufficient amount of oxygen can be supplied to the fuel cell, and high power generation performance of the fuel cell system can be maintained.

The compression regenerative machine for a fuel cell according to the present invention regulates the pressure of the oxygen-containing gas but need not regulate the pressure of the fuel that would otherwise require a large-scale setup. Therefore, the production cost of the fuel cell device can be lowered.

The compression regenerative machine for a fuel cell according to the present invention can thus maintain a high durability while the fuel cell device maintains a high power generation performance, and can prevent an increase in the production cost.

The present invention may be more fully understood from the description of preferred embodiments of the invention set forth below, together with the accompanying drawings.

DESCRIPTION OF THE PREFERRED EMBODIMENTS

Hereinafter, the first and second embodiments of the present invention that embody the compression regenerative machine for a fuel cell according to the present invention will be explained with reference to the accompanying drawings.

(Embodiment 1)

Figure 1:
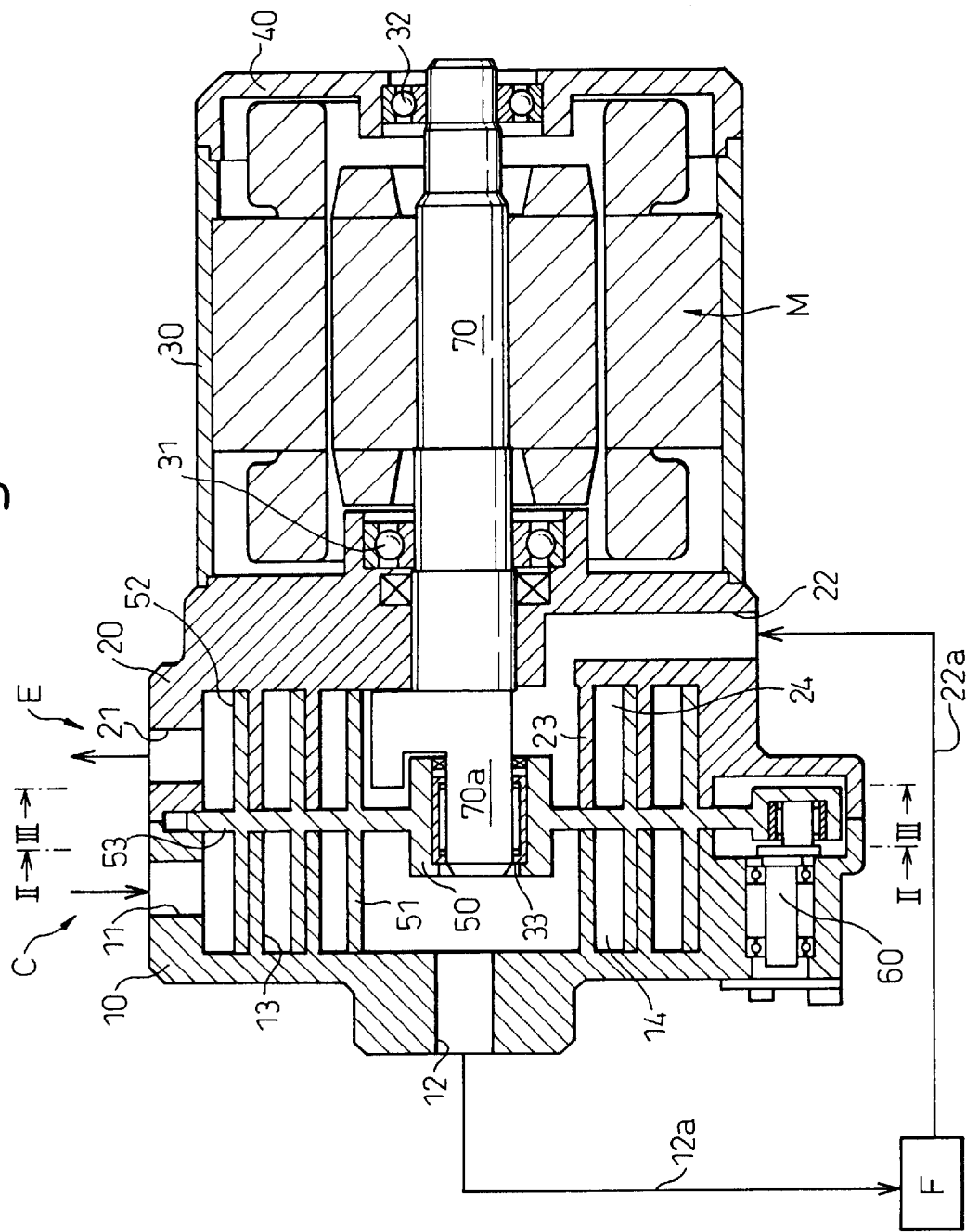
FIG. 1 is an overall longitudinal sectional view of a compression regenerative machine for a fuel cell according to the first embodiment of the present invention.

In the compression regenerative machine for a fuel cell according to the first embodiment, a center housing 20 is coupled with a front housing 10, and a cylindrical case 30 is coupled with the rear end of the center housing 20 as shown in FIG. 1. A rear housing 40 is coupled with the rear end of the case 30.

An air suction port 11, that is open to the atmosphere, is open on the side surface of the front housing 10 in a radial direction. An air discharge port 12 is open at the front end of the center portion of the front housing 10 in an axial direction. An air feed pipe 12a, that is connected to the fuel cell F on the supply side of an oxygen-containing gas, is connected to the air discharge port 12. A first stationary spiral member 13 is so formed in the front housing 10 as to protrude rearward in the axial direction.

Another air discharge port 21, that is open to the atmosphere, is so formed as to be open on the side surface of the center housing 20 in the radial direction, and an air introduction port 22 is open, too. An air discharge pipe 22a, which is communicated with the discharge side of the exhaust gas of the fuel cell F, is connected to the air introduction port 22. A second stationary spiral member 23 is so formed as to protrude forward in the axial direction in the center housing 20.

Figure 2:
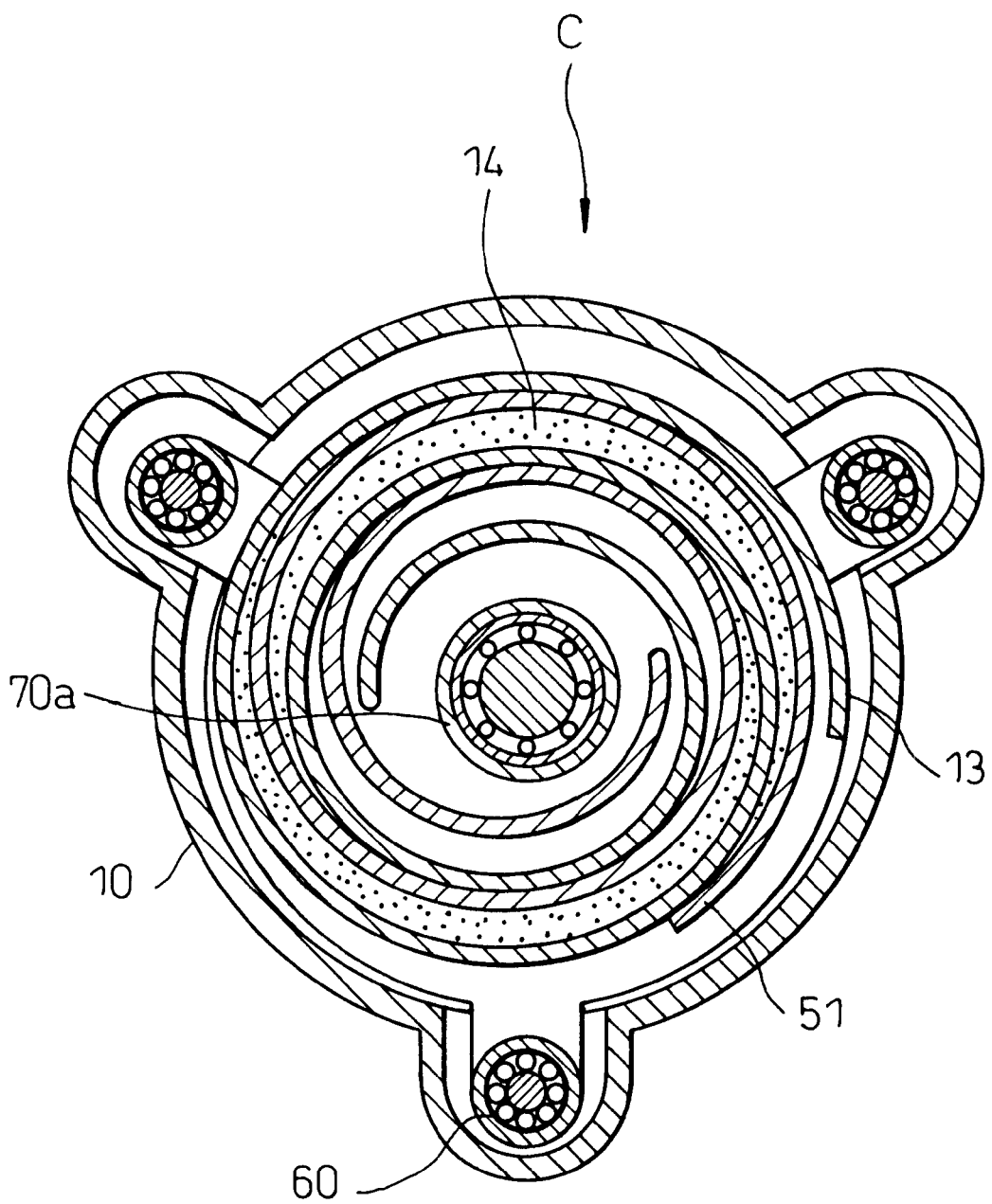
FIG. 2 is sectional view taken along a line II—II in FIG. 1.
Figure 3:
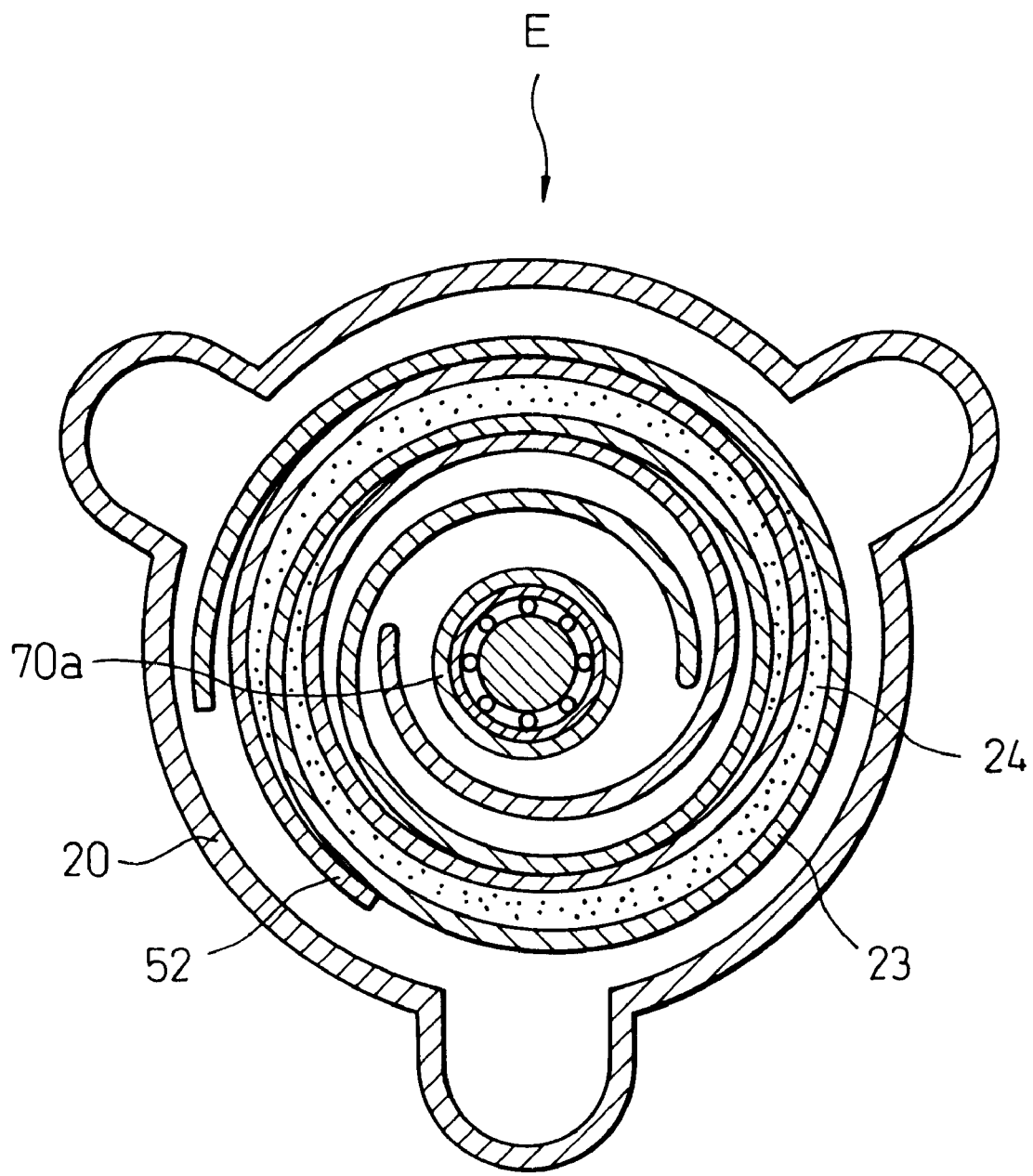
FIG. 3 is a sectional view taken along a line III—III in FIG. 1.

A side plate 53 is sandwiched between the front housing 10 and the center housing 20 each having the structure described above. A first movable spiral member 51 is so formed on this side plate 53 as to protrude forward in the axial direction, and a second movable spiral member 52 is so formed as to protrude rearward in the axial direction. The first movable spiral member 51 of the side plate 53 meshes with the first stationary spiral member 13 of the front housing 10, as shown in FIG. 2. The second movable spiral member 52 of the side plate 53 meshes with the second stationary spiral member 23 of the center housing 20, as shown in FIG. 3.

A rotation prevention mechanism 60 is interposed between the front housing 10, the center housing 20 and the side plate 53. A boss 50 is formed at the center of the side plate 53 in such a fashion as to protrude both forward and rearward in the axial direction. A drive shaft 70 is rotatably supported by the center housing 20 and the rear housing 40 through bearings 31 and 32 inside the case 30. A motor M inclusive of the drive shaft 70 is provided in the case 30. A crank pin 70a protrudes, eccentrically to the axis, from the front end of the drive shaft 70, and is rotatably fitted into a boss 50 of the side plate 53a through bearing 33.

A crescent shaped compression chamber 14 is confined and defined by the front housing 10 and the side plate 53 as shown in FIG. 2, and these members together constitute a scroll type compression mechanism portion C. The air suction port 11 is communicated with the compression chamber 14 that is not yet confined, as shown in FIG. 1. The air discharge port 12 is communicated with the compression chamber 14 that is confined when the compression operation is completed. A crescent shaped regenerative chamber 24 is confined and defined by the center housing 20 and the side plate 53 as shown in FIG. 3, and these members together constitute a scroll type regenerative mechanism portion E. The air discharge port 21 is communicated with the regenerative chamber 24 that is not confined after the final expansion operation is completed. The air introduction port 22 is communicated with the closed generative chamber 24 having the smallest volume.

When the drive shaft 70 is driven by the motor M in the compression regenerative machine for a fuel cell having the structure described above as shown in FIG. 1, the side plate 53 only orbits while its rotation is restricted by the rotation prevention mechanism 60. Consequently, as the capacity of the compression chamber 14 of the compression mechanism portion C gradually decreases, air in the atmosphere is sucked from the air suction port 11 into the compression chamber 14. After being compressed to a high pressure in the compression chamber 14, the air is supplied from the air discharge port 12 into the fuel cell F through the air feed pipe 12a. Oxygen in the air is consumed in the fuel cell F, and the air remaining as the exhaust gas G is supplied from the air discharge pipe 22a into the regenerative chamber 24 of the regenerative mechanism portion E through the air introduction port 22.

The exhaust gas supplied into the regenerative chamber 24 expands simultaneously with the operation described above. Therefore, the capacity of the regenerative chamber 24 must gradually increase. The majority of the exhaust gas in the regenerative chamber 24 is expanded to the atmospheric pressure and is discharged from the air discharge port 21 into the atmosphere. In the interim, the drive shaft 70 is driven to generate power, and this power assists the power of the motor M that operates the compression mechanism portion C.

Figure 4:
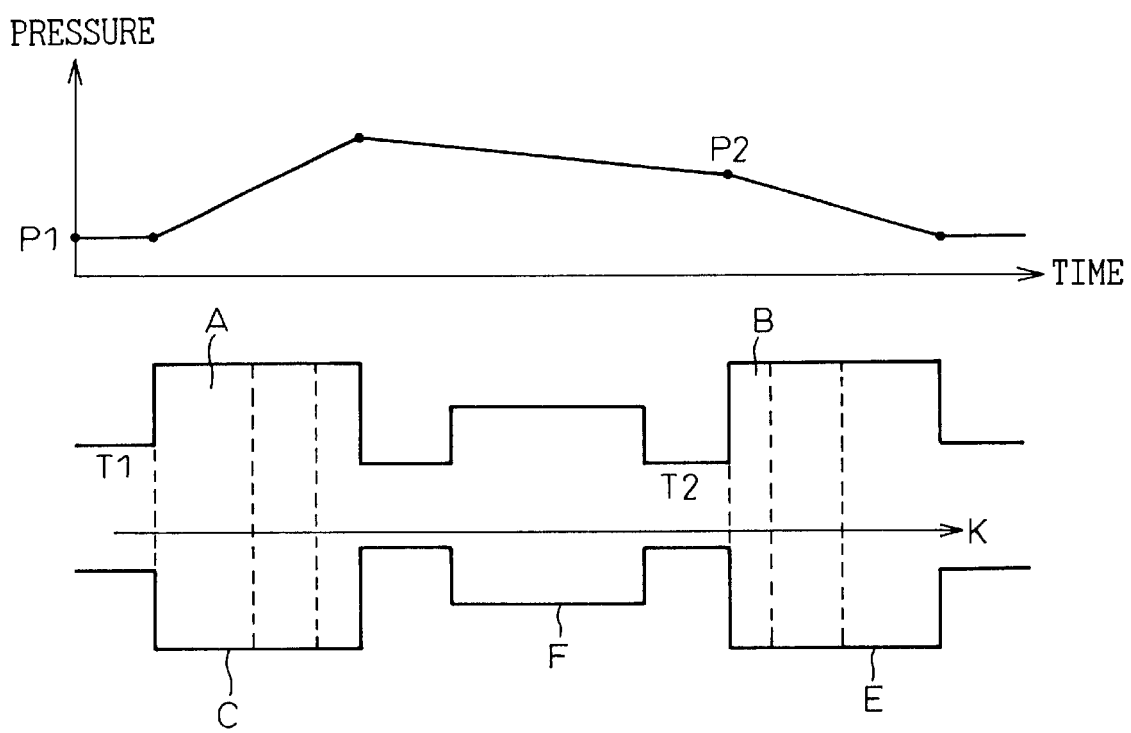
FIG. 4 is an explanatory view showing the construction of the fuel cell systems according to the first and second embodiments.

The compression chamber 14 and the regenerative chamber 24 of the compression regenerative machine for this fuel cell constitute the fuel cell system with the fuel cell F as shown in FIG. 4. The air confined in the compression chamber 14 is compressed to a predetermined pressure and is then supplied into the fuel cell F. After oxygen in the air reacts with hydrogen and is consumed in the fuel cell, the air having a pressure $P_2$ decreased the pressure loss is discharged into the regenerative chamber 24. The exhaust gas (air) is expanded to the atmospheric pressure, that is, to a pressure $P_1$, inside the regenerative chamber 24, and is then discharged into the atmosphere. In this case, the pressure $P_1$ (MPa) of the closed compression chamber 14 defined by the compression mechanism portion C and the pressure $P_2$ (MPa) of the closed regenerative chamber 24 defined by the regenerative mechanism portion E are determined by the following relation:

$$P_2 = (A/B)(T_2/T_1)\cdot\eta_{VA}\cdot\eta_{VB}\cdot P_1 \quad (1)$$

: where A (cc) is the capacity of the compression chamber 14 of the compression mechanism portion C, $T_1$ (K) is its temperature, $\eta_{VA}$ is its capacity efficiency, B (cc) is the capacity of the regenerative chamber 24 of the regenerative mechanism portion E, T2 (K) is its temperature, and $\eta_{VB}$ is its capacity efficiency. This equation (1) can be modified to the following equation (2).

$$(A/B) = (P_2/P_1)\cdot(T_1/T_2)/(\eta_{VA}\cdot\eta_{VB}) \quad (2)$$

Assuming that leakage of the air K as the oxygen-containing gas does not exist in the compression mechanism portion C and in the regenerative mechanism portion E, then, Since the compression chamber 14 first confines air K at the atmospheric pressure by the compression mechanism portion C, the pressure $P_1$ of the compression chamber 14 is 1 atm, that is, $$P_1 = 0.1 \text{ (MPa)}$$

Furthermore, since the regenerative chamber 24 first confines the discharge gas discharged from the fuel cell F by the regenerative mechanism portion E, the pressure $P_2$ of the regenerative chamber 24 should be equal to the pressure inside the fuel cell F. Therefore, the lower limit of the pressure $P_2$ of the regenerative chamber 24 is set to the pressure at which the fuel cell F can sufficiently generate power, and the upper limit is set to the pressure where the durability of the fuel cell F reaches the limits. The result of an experiment conducted by the inventors of the present invention revealed that the range of this pressure is as follows:

$$P_2 = 0.15 \text{ to } 0.3 \text{ (MPa)}$$

The intake air temperature of the compressor is assumed to be from 20 to 80° C., that is:

$$T_1 = 293 \text{ to } 353 \text{ (K)}$$

The exhaust gas confined in the regenerative chamber 24 is expanded by the regenerative mechanism portion E and is cooled. Assuming in this case that the upper limit temperature capable of being cooled by the regenerative mechanism portion E is 80° C., $$T_2 = 353 \text{ (K)}$$

In this way, $\eta_{VA}$, $\eta_{VB}$, $P_1$, $P_2$, $T_1$ and $T_2$ are determined and put into the equation (2). In consequence, the ratio of the capacity of the compression chamber 14 to the capacity of the regenerative chamber 24 is given as follows:

$$(A/B) = 1.25 \text{ to } 3$$

When the capacity A of the compression chamber 14 and the capacity B of the regenerative chamber 24 are set on the basis of the capacity ratio within this range, the difference between the pressure of the fuel and the pressure of the air K becomes small in the compression regenerative machine of this first embodiment. Since a large load does not act on the electrolyte layer in the fuel cell F, the electrolyte layer of the fuel cell F is not damaged. In this instance, since the pressure of the air K is not excessively lowered, a sufficient amount of oxygen can be supplied into the fuel cell F, and high power generation performance of the fuel cell system can be maintained.

The compression regenerative machine for a fuel cell regulates the pressure of the air K but need not regulate the pressure of the fuel that requires a large-scale installation. Therefore, the production cost of the fuel cell device can be reduced.

The compression regenerative machine for a fuel cell enables the fuel cell system to exhibit a high durability while it maintains a high power generation performance, and can prevent an increase in the production cost.

In the compression regenerative machine for a fuel cell, power generated by the regenerative mechanism portion E assists the power that operates the compression mechanism portion C. Therefore, useless power consumption by the regenerative mechanism portion E can be avoided, and the power of the compression mechanism portion C can be assisted as residual energy is recovered from the exhaust gas of the fuel cell F. In this way, the mechanical efficiency can be further improved. In addition, since the compression mechanism portion C and the regenerative mechanism portion E are driven by the same drive shaft 70, the construction can be simplified and the production cost can be reduced.

Because both the compression mechanism portion C and the regenerative mechanism portion E are of the scroll type in this compression regenerative machine for a fuel cell, quiet and lightness can be provided. The scroll type compression mechanism portion C and the scroll type regenerative mechanism portion E of this compression regenerative machine for a fuel cell share the side plate 53 having the first and second movable spiral members 51 and 52 that protrude from the side plate 53. Therefore, this construction can be remarkably simplified and the production cost can be reduced. The total length in an axial direction inclusive of the shaft of the motor M can be shortened, and excellent mountability to the car can be achieved.

(Embodiment 2)

Figure 5:
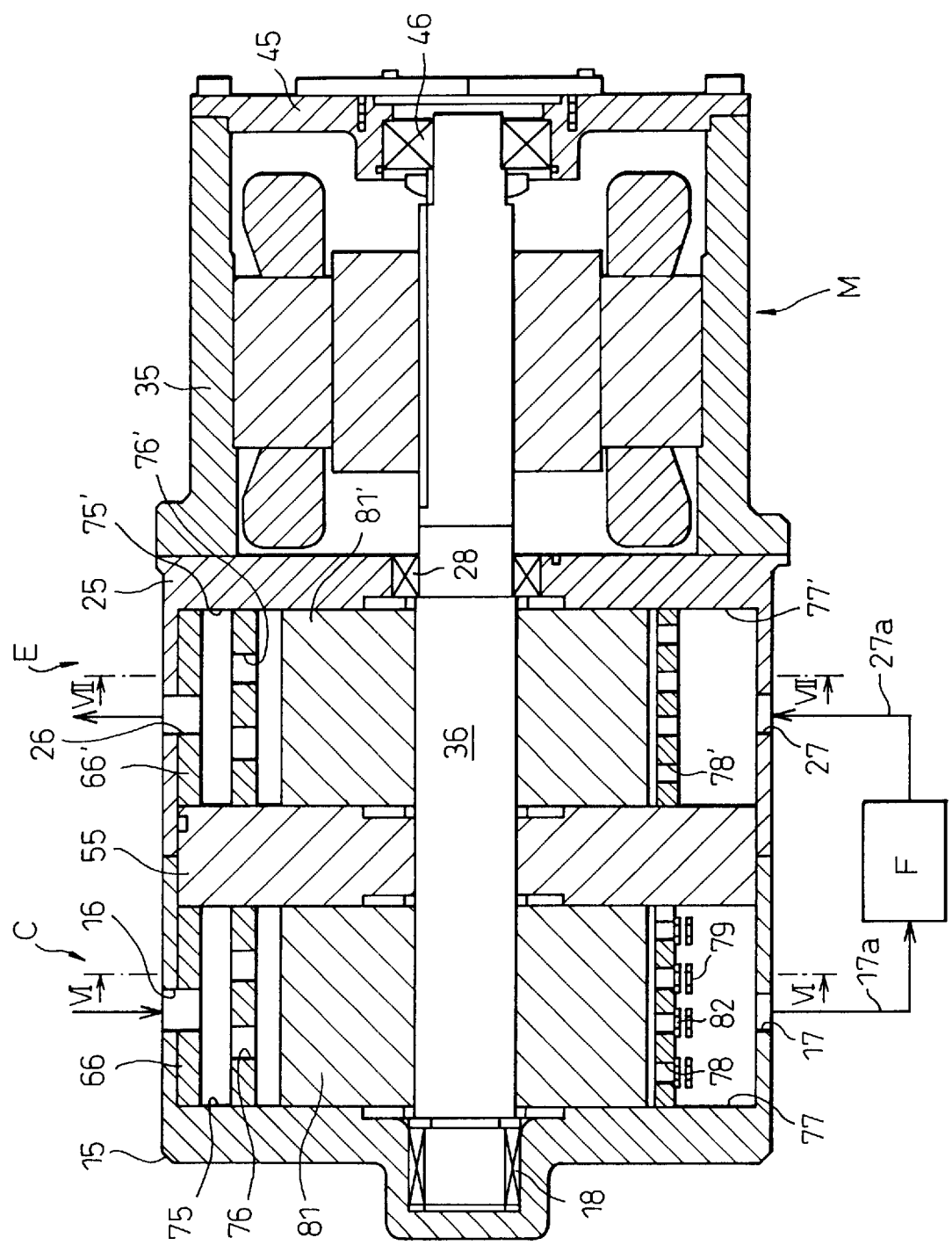
FIG. 5 is an overall longitudinal sectional view showing the principal portions of a compression regenerative machine for a fuel cell according to the second embodiment of the present invention.

In the compression regenerative machine for a fuel cell according to the second embodiment of the present invention, a center housing 25 is coupled with a front housing 15, and a cylindrical case 35 is coupled with the rear end of the center housing 25, as shown in FIG. 5. A rear housing 45 is coupled with the rear end of the case 35. A partition plate 55 is interposed between the front housing 15 and the center housing 25. A drive shaft 36 is rotatably supported by the front housing 15, the center housing 25 and the rear housing 45 through bearings 18, 28 and 46.

An air suction port 16, that is open to the atmosphere, is formed on the side surface of the front housing 15 in a radical direction, and an air discharge port 17 is also opened. An air feed pipe 17a, that communicates with the oxygen-containing gas supply side of the fuel cell F, is connected to the air discharge port 17.

Figure 6:
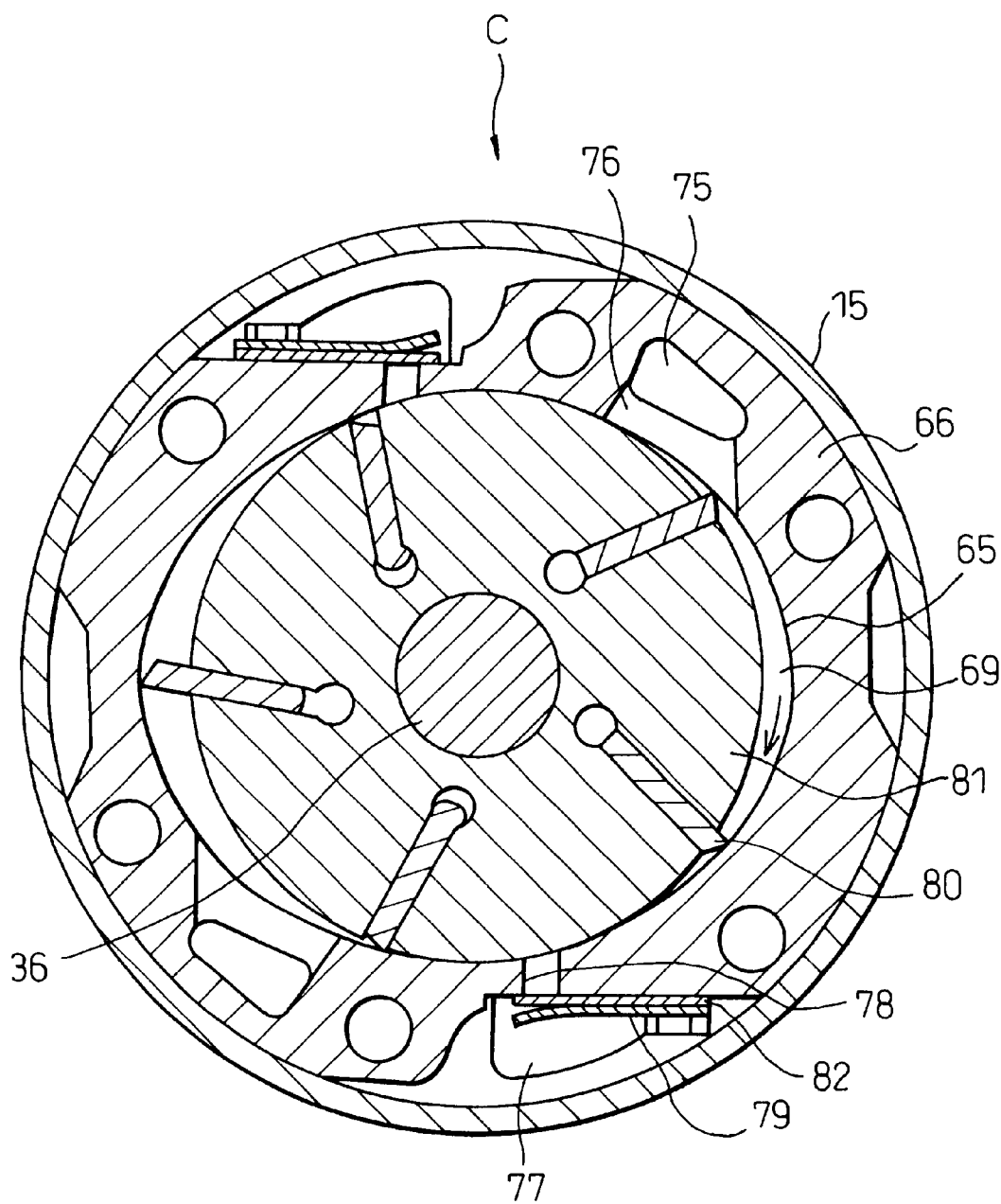
FIG. 6 is a sectional view taken along a line VI—VI in FIG. 5.

The front housing 15 accommodates, at the center thereof, a cylinder block 66 that defines an elliptic rotor chamber 65 as shown in FIG. 6. A first rotor 81 having a circular sectional shape and fixed to a drive shaft 36 is rotatably disposed in this rotor chamber 65. A plurality of first vanes 80 are so disposed on the cuter peripheral surface of the first rotor 81 as to protrude in the radial direction. In this way, the cylinder block 66, the first rotor 81 and each two first vanes 80 define a compression chamber 69 inside the rotor chamber 65.

An air suction chamber 75 communicating with the air suction port 16 is defined in the cylinder block 66 as shown in FIG. 5. The air suction chamber 75 is communicated with the compression chamber 69 by a suction port 76 as shown in FIG. 6. Similarly, an air discharge chamber 77 communicating with the air discharge port 17 is formed inside the cylinder block 66. The air discharge chamber 77 is communicated with the compression chamber 69 by a discharge port 78 as shown in FIG. 6. A discharge reed valve 82 that closes the discharge port 78 is disposed in the air discharge chamber 77, and a retainer 79 is disposed outside the discharge reed valve 82. A compression mechanism portion C is formed in the space defined by the front housing 15 and the partition plate 55.

Furthermore, an air discharge port 26, that is opened to the atmosphere, is formed in the side surface of the center housing 25 in the radial direction as shown in FIG. 5, and air introduction port 27 is also formed to be open. An air discharge pipe 27a communicating with the exhaust gas discharge side of the fuel cell F is connected to the air introduction port 27.

Figure 7:
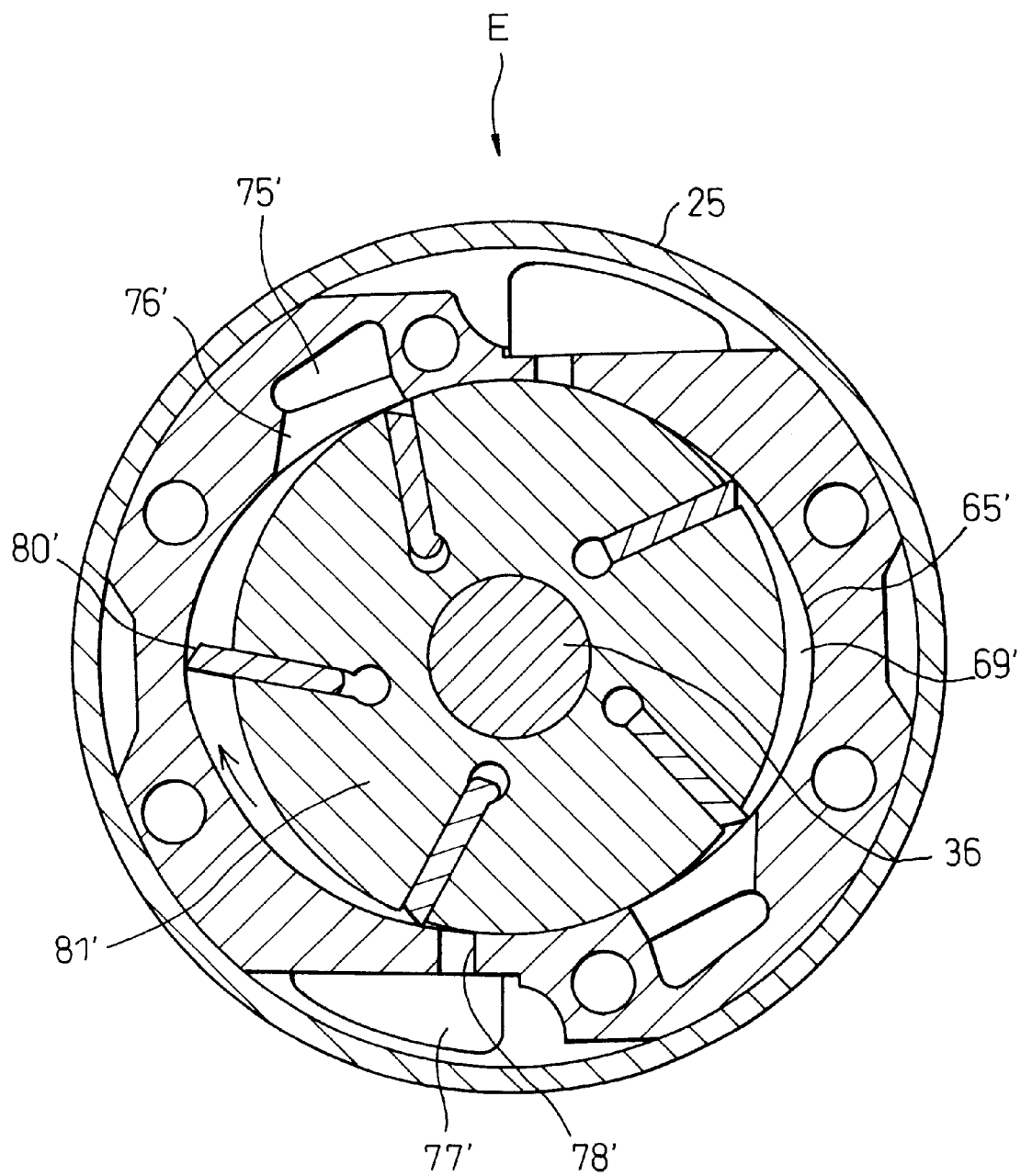
FIG. 7 is a sectional view taken along a line VII—VII in FIG. 5.

The center housing 25, too, accommodates a cylinder block 66' that defines an elliptic rotor chamber 65' as shown in FIG. 7. A second rotor 81' having a circular section and fixed to the drive shaft 36 is also disposed rotatably inside this rotor chamber 65', too. A plurality of second vanes 80' are likewise disposed on the outer peripheral surface of the second rotor 81' in such a manner as to protrude in the radial direction. A regenerative chamber 69' that is encompassed by the cylinder block 66', the second rotor 81' and each two second vanes 80' is formed in the rotor chamber 65'.

An air feed chamber 77' communicating with the air introduction port 27 is formed in the cylinder block 66' as shown in FIG. 5. The air feed chamber 77' is communicated with the regenerative chamber 69' through a suction port 78' as shown in FIG. 7. Similarly, an air discharge chamber 75' communicating with the air discharge port 26 is formed in the cylinder block 66' as shown in FIG. 5. The air discharge chamber 75' is communicated with the regenerative chamber 69' by a discharge port 76' as shown in FIG. 7. In this way, a regenerative mechanism portion E is formed in the space that is defined by the center housing 25 and the partition plate 55.

A motor M inclusive of the drive shaft 36 is accommodated in the case 35 as shown in FIG. 5.

When the motor M drives the drive shaft 36 in the vane type compression regenerative machine for a fuel cell having the construction described above, the first rotor 81 and the second rotor 81' are rotated. Consequently, the capacity of the compression chamber of the compression mechanism portion C gradually decreases. In this instance, air in the atmosphere is sucked from the air suction port 16 into the compression chamber 69 through the air suction chamber 75 and is compressed to a high pressure in the compression chamber 69. The air is thereafter supplied from the air discharge chamber 77 to the fuel cell F and passes through the air discharge port 17 and then through the air feed pipe 17a. Oxygen in the air is consumed in the fuel cell F and the air that remains as the exhaust gas is supplied from the air discharge pipe 27a to the regenerative chamber 69' of the regenerative mechanism portion E through the air introduction port 27.

The exhaust gas supplied into the regenerative chamber 69' expands simultaneously with the operation described above with the result that the capacity of the regenerative chamber 69' gradually expands. The discharge gas in the regenerative chamber 69' is expanded to the atmospheric pressure and is discharged into the atmosphere from the air discharge chamber 75' through the air discharge port 26. In the interim, the drive shaft 36 is driven in the same way as in the first embodiment and generates power, and this power assists the power of the motor M that drives the compression mechanism portion C.

When the capacity ratio of the compression chamber 69 to the regenerative chamber 69' of the compression regenerative machine for a fuel cell according to this embodiment is the same as in the first embodiment, this embodiment exhibits the same function and effect as in the first embodiment.

In this compression regenerative machine for a fuel cell according to this embodiment, both compression mechanism portion C and regenerative mechanism portion E are of the vane type. Therefore, it exhibits excellent quietness, but the level of quietness is somewhat worse than that of the first embodiment. Since the first rotor 81 and the second rotor 81' have the same construction in the compression regenerative machine for a fuel cell, this embodiment can reduce the production cost.

Incidentally, the capacity ratio of the compression chamber to the regenerative chamber must fall within the specific range in the compression regenerative machine for a fuel cell according to the present invention. Therefore, the compression mechanism portion and the regenerative mechanism portion are limited to the displacement type. Examples of the compression mechanism portion and the regenerative mechanism portion of the displacement type are a scroll type, a vane type, a screw type and a piston type.

While the invention has been described by reference to specific embodiments chosen for purposes of illustration, it should be apparent that numerous modifications could be made thereto by those skilled in the art without departing from the basic concept and scope of the invention.

What is claimed is:

1. A compression regenerative machine for a fuel cell, including:
    a compression mechanism portion of a displacement type, adapted for connection to an oxygen-containing gas supply side of a fuel cell; and
    a regenerative mechanism portion of a displacement type, adapted for connection to an exhaust gas discharge side of said fuel cell;
    wherein a closed compression chamber defined by said compression mechanism portion and a closed regenerative chamber defined by said regenerative mechanism portion have a capacity ratio of 1.25 to 3;
    wherein power generated by said regenerative mechanism portion assists the power for operating said compression mechanism portion; and
    wherein said compression mechanism portion and said regenerative mechanism portion are operated by the same drive shaft.

2. A compression regenerative machine for a fuel cell according to claim 1, wherein at least one of said compression mechanism portion and said regenerative mechanism portion is of a scroll type.

3. A compression regenerative machine for a fuel cell according to claim 2, wherein said compression mechanism portion comprises a housing, one of the surfaces of a side plate caused to orbit about said drive shaft and a first spiral member so formed on said one surface as to protrude therefrom, and said regenerative mechanism portion comprises said housing, the other surface of said side plate, and a second spiral member so formed on said other surface as to protrude therefrom.

4. A compression regenerative machine for a fuel cell according to claim 1, wherein at least one of said compression mechanism portion and said regenerative mechanism portion is of a vane type.

5. A compression regenerative machine for a fuel cell according to claim 4, wherein said compression mechanism portion comprises a housing, a first rotor rotated by a drive shaft and first vanes capable of protruding in a radial direction from said first rotor, and said regenerative mechanism portion comprises a housing, a second rotor rotating coaxially with said first rotor, and second vanes capable of protruding in a radial direction from said second rotor.

* * * * *